United States Patent
Dandekar et al.

(10) Patent No.: US 7,805,598 B2
(45) Date of Patent: Sep. 28, 2010

(54) AUTO-DETECTING AND AUTO-CORRECTING SYSTEM STATE CHANGES BEFORE BOOTING INTO OPERATING SYSTEMS

(75) Inventors: Shree A. Dandekar, Round Rock, TX (US); Alan E. Beelitz, Leander, TX (US); John Hawk, Austin, TX (US); Alok Pant, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 784 days.

(21) Appl. No.: 11/743,785

(22) Filed: May 3, 2007

(65) Prior Publication Data

US 2008/0273550 A1 Nov. 6, 2008

(51) Int. Cl.
*G06F 9/24* (2006.01)
*G06F 15/177* (2006.01)

(52) U.S. Cl. .............................. 713/1; 713/2; 713/100; 714/15

(58) Field of Classification Search ............... 713/1, 713/2, 100; 714/15
See application file for complete search history.

(56) References Cited

U.S. PATENT DOCUMENTS

| | | | |
|---|---|---|---|
| 5,388,267 A | 2/1995 | Chan et al. | 395/700 |
| 5,504,905 A * | 4/1996 | Cleary et al. | 713/100 |
| 6,298,427 B1 | 10/2001 | Beelitz | 711/173 |
| 6,327,706 B1 | 12/2001 | Amberg et al. | 717/11 |
| 6,353,885 B1 | 3/2002 | Herzi et al. | 713/1 |
| 6,393,559 B1 * | 5/2002 | Alexander | 713/2 |
| 6,427,091 B1 | 7/2002 | Davis et al. | 700/115 |
| 6,438,688 B1 | 8/2002 | Nunn | 713/2 |
| 6,510,512 B1 | 1/2003 | Alexander | 713/2 |
| 6,550,062 B2 | 4/2003 | Barajas et al. | 717/178 |
| 6,640,316 B1 | 10/2003 | Martin et al. | 714/36 |
| 6,714,937 B1 | 3/2004 | Eynon et al. | 707/102 |
| 6,721,946 B1 | 4/2004 | Fogarty et al. | 717/175 |
| 6,765,788 B2 | 7/2004 | Wu | 361/680 |
| 6,934,546 B1 | 8/2005 | Corbett et al. | 455/441 |
| 6,986,034 B2 | 1/2006 | Tyner et al. | 713/2 |
| 7,000,101 B2 | 2/2006 | Wu et al. | 713/1 |
| 7,188,171 B2 * | 3/2007 | Srinivasan et al. | 709/224 |
| 2002/0026571 A1 | 2/2002 | Rickey | 713/2 |
| 2003/0012114 A1 | 1/2003 | Larvoire et al. | 369/100 |
| 2003/0131248 A1 * | 7/2003 | Huang | 713/188 |
| 2004/0044886 A1 | 3/2004 | Ng et al. | 713/1 |
| 2004/0088692 A1 | 5/2004 | Stutton et al. | 717/168 |
| 2004/0153840 A1 | 8/2004 | Buchanan, Jr. et al. | 714/42 |
| 2004/0255106 A1 * | 12/2004 | Rothman et al. | 713/1 |
| 2005/0005197 A1 | 1/2005 | Chong et al. | 714/36 |
| 2006/0015732 A1 | 1/2006 | Liu | 713/176 |
| 2006/0031669 A1 | 2/2006 | Liang et al. | 713/100 |
| 2006/0041738 A1 | 2/2006 | Lai | 713/2 |
| 2006/0041740 A1 | 2/2006 | Hsu | 713/2 |
| 2006/0047940 A1 | 3/2006 | Chiu et al. | 713/2 |
| 2006/0149956 A1 | 7/2006 | Chang | 713/1 |
| 2006/0155988 A1 | 7/2006 | Hunter et al. | 713/164 |

* cited by examiner

*Primary Examiner*—Thomas Lee
*Assistant Examiner*—Michael J Brown
(74) *Attorney, Agent, or Firm*—Hamilton & Terrile, LLP; Stephen A. Terrile

(57) ABSTRACT

A mechanism via which system state changes can be detected and corrected automatically prior to a customer initiated boot. The mechanism is extensible to address newly added or discovered system state changes that result in a locked condition. The mechanism detects and corrects adverse events before booting into the operating system.

15 Claims, 5 Drawing Sheets

| Field | Offset | Length (in bytes) | Value |
|---|---|---|---|
| Signature | 0 | 4 | "MD20" |
| Version | 4 | 2 | 0100 i.e. 1.0 |
| Checksum | 6 | 1 | <checksum> |
| PORT_INDEX | 7 | 1 | <port index> |
| PORT_VALUE | 8 | 1 | <port value> |

AUTO-DETECTING AND AUTO-CORRECTING SYSTEM STATE CHANGES BEFORE BOOTING INTO OPERATING SYSTEMS

BACKGROUND OF THE INVENTION

1. Field of the Invention

The present invention relates to information handling systems and more particularly to correcting system state changes within an information handling system before booting into an operating system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Sometimes during the operation of an information handling system, system state changes can occur. Certain system state changes (e.g., changing the amount of installed memory, flashing the basic input output system (BIOS) to a different version, etc.) can cause operating system related system files (such as the hibernation file hiberfil.sys) to be corrupted or invalid. When a customer attempts to boots a system that has experienced this behavior, the customer might receive a blue screen condition (i.e., a condition in which the information handling system is locked up and cannot escape) or be asked in very cryptic language if they want to delete the corrupted system file and do a full boot. This situation can lead to a poor customer experience. In certain states, the customer may not even get an option to reboot the information handling system without performing a full operating system reinstall.

For example, a blue screen condition can occur within an Instant On enabled system in the MediaDirect partition when the amount of system memory is changed. MediaDirect image is always hibernated and if a user changes memory size without following proper steps and tries to boot into a hibernated image the hiberfil.sys file gets corrupted. Also for example, BIOS changes, such as updates to BIOS flash memory, may lead to system file corruption. Also for example, CMOS corruption caused by bad memory or a motherboard replacement can cause a locked condition. Also for example, switching a RAID configuration of the information handling system, such as from a RAID 1 configuration to a RAID 0 configuration using, e.g., an Intel Matrix Storage Manager (IMSM). Other examples of RAID configuration changes include switching from a RAID 0 configuration to a RAID 1 configuration, such as when a customer adds additional hard drives to the information handing system, switching from a RAID ON configuration to a Serial ATA configuration results in a change in the BIOS on a RAID enabled system, switching from a Serial ATA configuration to a RAID ON configuration results in a change in the BIOS on a RAID enabled system. Also for example, an NT operating system signature corruption or a master boot record (MBR) corruption such as when a customer adds a hard drive to the information handing system without initialization of the added hard drive can cause a locked condition. Also for example, disk signature corruption caused by MBR changes can result in a locked condition. Also for example, with a Linux fdisk utility, such as that found on the 7.x version of Linux, if a hard disk in a multi-disk configuration does not have a valid signature of AA55h in the last word of an MBR, the fdisk utility could fail when an attempt is made to use it. Also for example, when a system management server (SMS) pushes to update flash memory in BIOS a locked condition can occur. Also for example, a power interruption during system hibernation can cause a locked condition to occur. Also for example, corruption of the hiberfil.sys file can cause a locked condition to occur. FIG. 1, labeled Prior Art, shows a flow chart of the operation of an information handling system when exemplative system state changes occur.

Accordingly, it would be desirable to provide a mechanism via which system state changes can be detected and corrected automatically prior to a customer initiated boot. It would also be desirable for such a mechanism to be extensible to address newly added or discovered system state changes that result in a locked condition.

SUMMARY OF THE INVENTION

In accordance with the present invention, a mechanism via which system state changes can be detected and corrected automatically prior to a customer initiated boot is set forth. The mechanism is extensible to address newly added or discovered system state changes that result in a locked condition. The mechanism detects and corrects adverse events before booting into the operating system.

In one embodiment, the invention relates to a method for automatically detecting and correcting information handling system state changes. The method includes determining whether a system state change occurred during a boot process before booting into an operating system, determining whether the system state change can cause the information handling system to improperly boot when booting into the operating system, identifying the system state change, and performing a corrective action based upon the identification.

In another embodiment, the invention relates to an apparatus for automatically detecting and correcting information handling system state changes. The apparatus includes means for determining whether a system state change occurred during a boot process before booting into an operating system, means for determining whether the system state change can cause the information handling system to improperly boot when booting into the operating system, means for identifying the system state change, and means for performing a corrective action based upon the identification.

In one embodiment, the invention relates to an information handling system which includes a method for automatically detecting and correcting information handling system state changes. The method includes a processor and memory coupled to the processor. The memory stores a system state change module for determining whether a system state change occurred during a boot process before booting into an operating system. The system state change module includes instructions executable by the processor for determining whether the system state change can cause the information handling system to improperly boot when booting into the operating system, identifying the system state change, and performing a corrective action based upon the identification.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
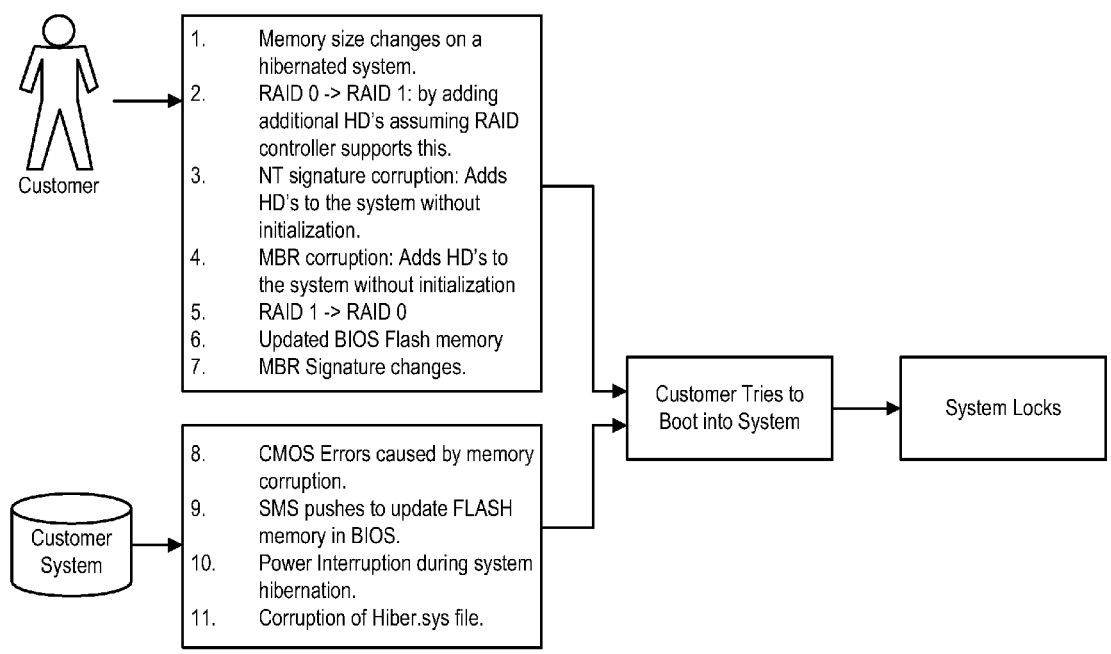
FIG. 1, labeled Prior Art, shows a flow chart of the operation of an information handling system when exemplative system state changes occur.
Figure 2:
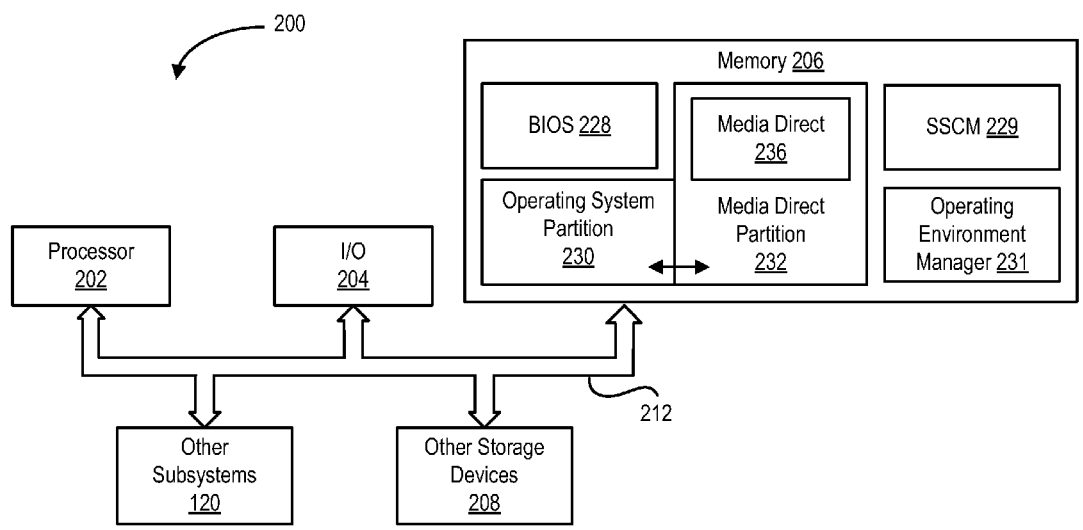
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers, memory 206, including volatile memory such as random access memory (RAM) and non-volatile memory such as read only memory (ROM) and hard disk drives, and other storage devices 208, such as a floppy disk and drive or CD-ROM disk and drive, and various other subsystems 210, all interconnected via one or more buses 212. The memory 206 includes a basic input output system 228. The BIOS 228 includes a system state change correction module 229. The memory also includes an operating environment manager 231 which interacts with the BIOS 228 and the system state change correction module 229.

The memory 206 also includes an operating system partition 230 as well as an instant on (e.g., media direct) partition 232. The instant on partition 232 includes an instant on application such as a MediaDirect application 236.

The system state change correction module 229 detects system state changes and automatically corrects these system state changes prior to a customer initiated boot. The system state change correction module 229 is extensible to address newly added or discovered system state changes that result in a locked condition. The system state change correction module 229 detects and corrects adverse events before booting into the operating system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
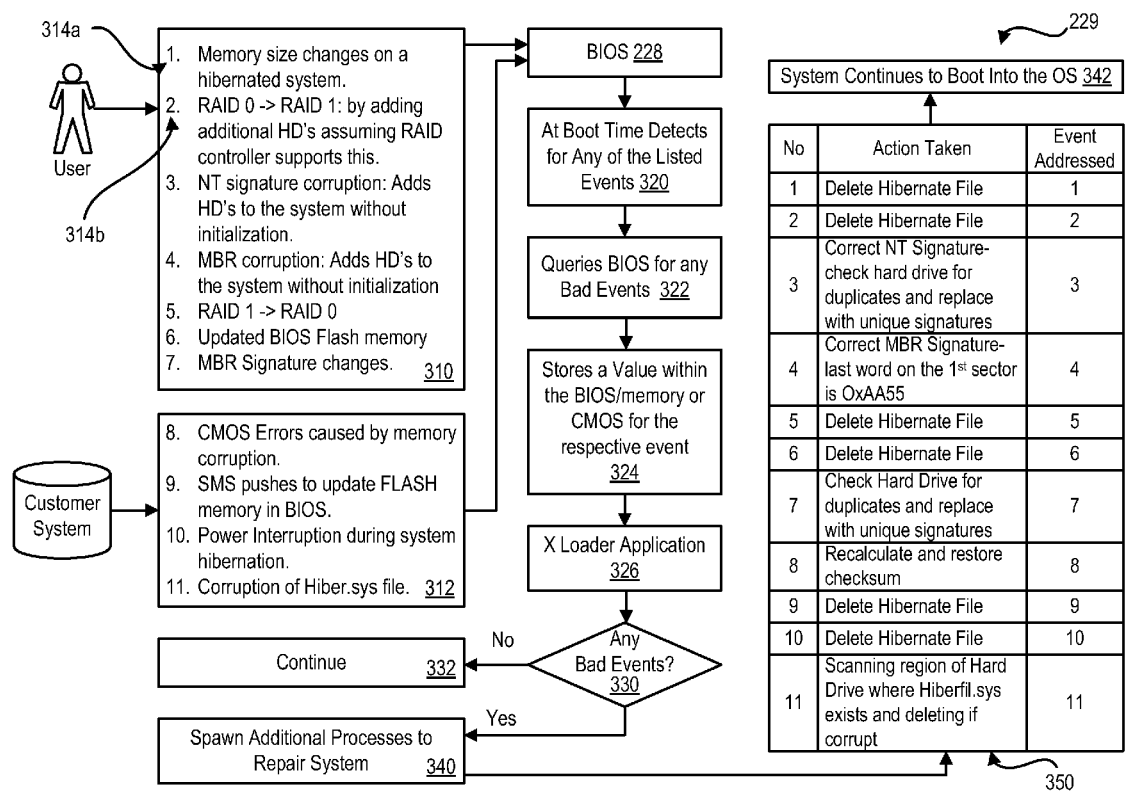
FIG. 3 shows a flow chart of the operation of a system state change correction module.

FIG. 3 shows a flow chart of the operation of the system state change correction module 229. More specifically, when a system state change occurs, either via a customer initiated system state change 310 or a system initiated system state change 312, the BIOS 228 captures the system state change and executes the system state change correction module 229. Each of the system state changes includes an associated system state change indication 214 (e.g., 214a, 214b).

More specifically, at boot time, the BIOS 228 detects whether any of the predetermined system state changes have occurred at step 320. If so, the system state change correction module 229 queries the BIOS 228 to determine whether any locked conditions have occurred as a result of the system state changes at step 322. If so, then the system state change correction module 229 stores a value within the BIOS memory or a CMOS location indicative of the detected event at step 324. The operating environment manager, also called the X-loader, incorporates the system state change correction module. Because this is a preboot environment, not an operating system, functions are handled by associated modules rather than separate applications. The operating environment manager 231 determines whether any of the system state changes can cause a system lockup or other type of undesirable result at step 330. If not, then the booting of the information handling system continues at step 332. If the operating environment manager 231 determines that an undesirable result of the system change is possible, then the operating environment manager 231 spawn additional processes to repair the information handing system at step 340 and the system continues to boot into the operating system at step 342.

An exemplative list of additional processes for actions taken by the system state change correction module 229 to auto correct the information handing system is set forth as step 350. More specifically, the system state change correction module 229 captures system changes related to critical events, and based upon the associated system state change indication 214 the system state change correction module 229 auto corrects the system before allowing a user to boot into an operating system at step 350. More specifically, if the system state change correction module 229 determines that the memory size changes have occurred to a hibernated system, then the corrective action taken by the system state change correction module 229 is to delete the hibernation file. If the system state change correction module 229 determines that RAID configuration of the information handling system changed from a RAID 0 configuration to a RAID 1 configuration, then the corrective action taken by the system state change correction module 229 is to delete the hibernation file. If the system state change correction module 229 determines that an operating system (e.g., a Windows NT operating system) signature corruption is present, then the corrective action taken by the system state change correction module 229 is to correct the NT signature and check the hard drive for signature duplicates and replace any duplicates with unique signatures. If the system state change correction module 229 determines that a master boot record (MBR) corruption is present, then the corrective action taken by the system state change correction module 229 is to correct the MBR signature (i.e., to assure that the last word of the first sector of the hard drive corresponds to 0xAA55). If the system state change correction module 229 determines that RAID configuration of the information handling system changed from a RAID 1 configuration to a RAID 0 configuration, then the corrective action taken by the system state change correction module 229 is to delete the hibernation file. If the system state change correction module 229 determines that the memory the BIOS flash memory has been updated, then the corrective action taken by the system state change correction module 229 is to delete the hibernation file. If the system state change correction module 229 determines that a master boot record (MBR) signature has changed, then the corrective action taken by the system state change correction module 229 is to check the hard drive for duplicates and replace any duplicates of the MBR signature with unique signatures.

Additionally, if the system state change correction module 229 determines that CMOS errors caused by memory corruption are present, then the corrective action taken by the system state change correction module 229 is to recalculate and restore a checksum value. If the system state change correction module 229 determines that an SMS has pushes to update the flash memory in BIOS, then the corrective action taken by the system state change correction module 229 is to delete the hibernation file. If the system state change correction module 229 determines that a power interruption occurred during system hibernation, then the corrective action taken by the system state change correction module 229 is to delete the hibernation file. If the system state change correction module 229 determines that a corruption of the hibernation file (hiberfil.sys) is present, then the corrective action taken by the system state change correction module 229 is to scan the region of the hard drive where the hibernation file resides and to delete the hibernation file. The hibernation file is deleted via a fixer module which reads a file allocation table and directories and interprets this information without operating system support. More specifically, the fixer module locates the directory entry for the hibernation file, walks the file allocation chain to mark the file's allocated space as available and then marks the hibernation file directory entry as erased.

Figure 4:
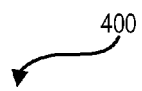
FIG. 4 shows an example of a Media Direct Table which is used by the system state change correction module.

FIG. 4 shows an example of a Media Direct Table which is used by the system state change correction module 229. More specifically, the operating environment manager 231 can use a Simple Boot Flag to differentiate Media boot vs. regular boot even though simple boot flag may be set on cases other than Media boot (e.g., the pretty boot feature under the Vista operating system. The Media Direct Table 400 allows the operating environment manager 231 to properly detect between a Media partition boot and a normal boot (i.e., to detect a boot type).

More specifically, during a boot operation, the BIOS 228 builds the Media Direct Table 400 (e.g., a 9 byte long table) within the 0xF000 segment of the memory 206. The table is DWORD aligned (i.e. aligned on a four-byte boundary). The Media Direct Table includes a signature field, a version field, a checksum field, a port index field and a port value field.

Figure 5:
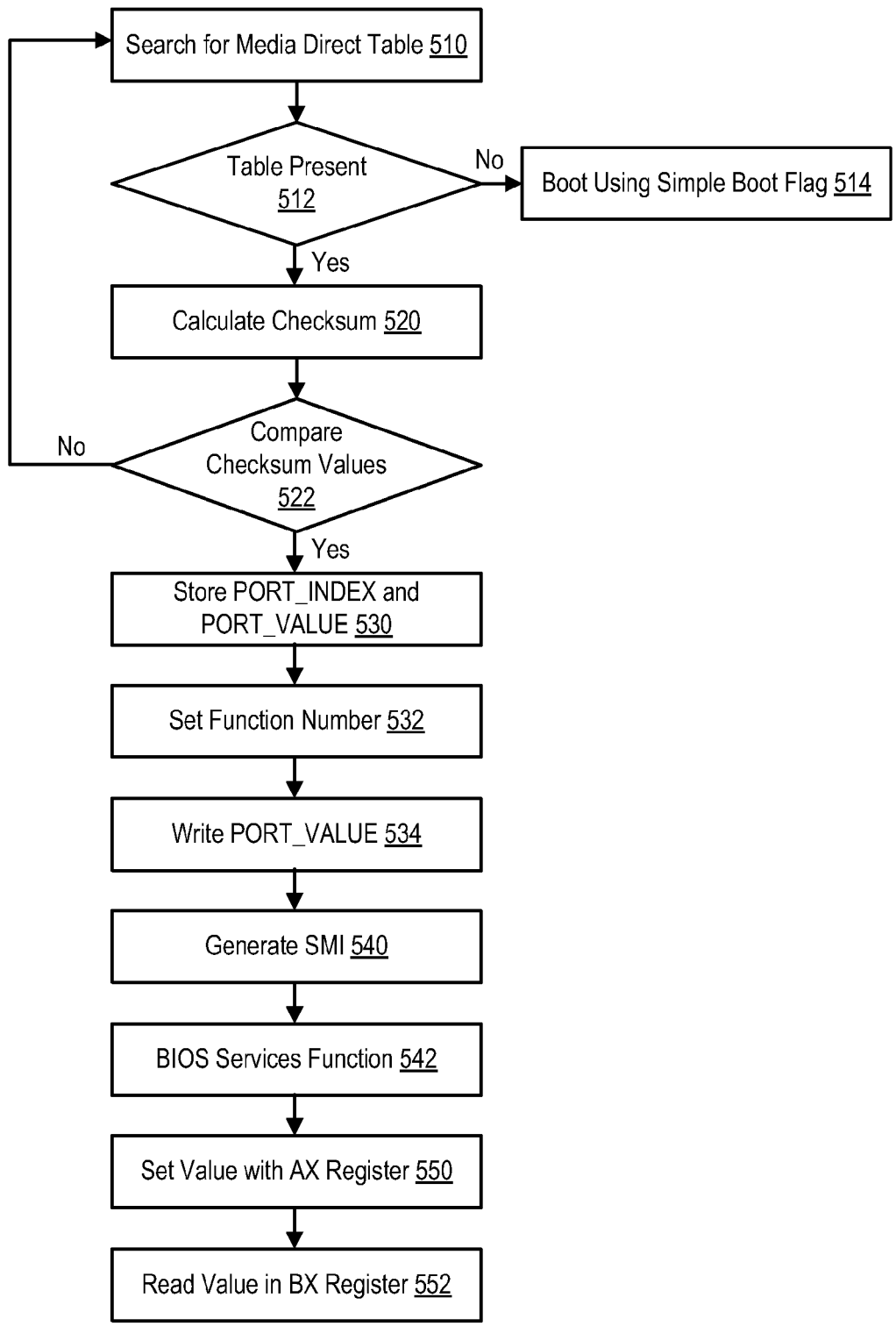
FIG. 5 shows a flow chart of the operation of the operating environment manager during a boot for any media services.

Referring to FIG. 5, a flow chart of the operation of the operating environment manager 231 during a boot for any media services is shown. More specifically, the operating environment manager 231 first searches the information handing system for the Media Direct Table 400 at step 510. The operating environment manager 231 searches in the 0xF000 segment using the signature "MD20." The operating environment manager 231 determines whether the media direct table 400 is present at step 512. If the table is absent then the operating environment manager 231 uses a simple boot flag at step 514.

If the operating environment manager 231 locates the media direct table then the operating environment manger calculates a checksum value of the table at step 520. The operating environment manager 231 then compares the calculated checksum value against the value stored within the checksum field of the media direct table at step 522. If the checksum values do not match, then the operating environment manager 231 returns to step 510 to continue searching for a media direct table.

If the checksum values do match, then the operating environment manager 231 stores a port index value (PORT_INDEX) and a port value (PORT_VALUE) in the media direct table 400 at step 530. The port index value represents an address of an input output port. Writes to the input output port generate a SMI that is serviced by the BIOS. The port value is a specific value that an application writes to the port index address.

Next, the operating environment manager 231 sets a function number in a predetermined location such as register AH within the processor 202 at step 532.

More specifically, the function number can be set to a 1 to provide media direct information. This media direct information can indicate whether the information handling system supports a MediaDirect feature, whether a MediaDirect button has been actuated to start the information handling system, whether the BIOS supports a hot start feature, and whether the BIOS requires any message suppression (such as when a Microsoft Vista operating system pretty boot feature is enabled).

Next, the operating environment manager 231 writes the PORT_VALUE to PORT_INDEX during the I/O port operation at step 534. Thus, when the operating environment manager writes the port value to the port index ,an SMI is generated. The location of the I/O port address corresponds to the port index value stored within the table. The specific value of the port value is specified by the media direct table.

The operation of storing the PORT_VALUE generates a system management interrupt (SMI). Upon generation of the SMI, the BIOS 228 services the required function. More specifically, the BIOS services the SMI by returning media feature information to the operating environment manager 231. Next, the AX register located within the processor 202 is set to 0 to indicate success of the function call or if the function fails the register AX is set to 0xFFFF at step 544. Any other value indicates BIOS services are absent.

Next the operating environment manager 231 checks whether the value stored within the processor register AX value is 0 at step 550. A value of 0 indicates success, a value of 0xFFFF indicates failure and any other value indicates that the BIOS services are absent.

Next, the operating environment manager 231 uses the value stored within register BX of the processor 202 to obtain the media feature information at step 552. The value stored within register BX can indicate that a current system is a MediaDirect capable system (e.g., by setting Bit0 to 1), that a user actuated a MediaDirect button to start the information handling system (e.g., by setting Bit1 to 1), that the BIOS supports a hot start feature of the Microsoft Vista operating system (e.g., by setting Bit2 to 1), that a pretty boot mode of operation is active (e.g., by setting Bit3 to 1), and that something has changed within the information handling system configuration that warrants deletion of the hiberfil.sys file (e.g., by setting Bit4 to 1).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-R/Ws, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, while one embodiment of the invention is disclosed in the context of an information handling system which includes a MediaDirect partition, it will be appreciated that an information handing system without a MediaDirect partition could still launch an operating environment manger and query the BIOS and otherwise interrogate the information handling system for system state changes that might require preboot intervention.

Consequently, the invention is intended to be limited only by the spirit and scope of the appended claims, giving full cognizance to equivalents in all respects.

What is claimed is:

1. A method for automatically detecting and correcting information handling system state changes for an information handling system having an operating system partition and an instant on partition, the method comprising:
    determining, when booting from the instant on partition, whether a system state change occurred during a boot process before booting into an instant on application stored on the instant on partition;
    determining whether the system state change can cause the information handling system to improperly boot when booting into the instant on application;
    identifying the system state change;
    performing a corrective action based upon the identifying; and wherein
    the determining whether the system state change can cause the information handling system to improperly boot includes determining whether any locked conditions have occurred as a result of the system state change.

2. The method of claim 1 wherein the system state change comprises a customer initiated system state change.

3. The method of claim 1 wherein the system state change comprises a system initiated system state change.

4. The method of claim 1 further comprising associating a system state change indication with each system state change; and,
    wherein the performing is based upon the system state change indication.

5. The method of claim 4 wherein
    performing the corrective action is via an operating environment manager, the operating environment manager spawning additional processes to repair the information handling system.

6. An apparatus for automatically detecting and correcting information handling system state changes for an information handling system having an operating system partition and an instant on partition, the apparatus comprising:
    means for determining, when booting from the instant on partition, whether a system state change occurred during a boot process before booting into an instant on application stored on the instant on partition;
    means for determining whether the system state change can cause the information handling system to improperly boot when booting into the instant on application;
    means for identifying the system state change;
    means for performing a corrective action based upon the identifying; and wherein
    the determining whether the system state change can cause the information handling system to improperly boot includes determining whether any locked conditions have occurred as a result of the system state change.

7. The apparatus of claim 6 wherein the system state change comprises a customer initiated system state change.

8. The apparatus of claim 6 wherein the system state change comprises a system initiated system state change.

9. The apparatus of claim 6 further comprising means for associating a system state change indication with each system state change; and, wherein
    the performing is based upon the system state change indication.

10. The method of claim 9 wherein
    the means for performing the corrective action comprises an operating environment manager, the operating environment manager spawning addition processes to repair the information handing system.

11. An information handling system comprising, the method comprising:
    a processor;
    a memory coupled to the processor, the memory having an operating system partition and an instant on partition, the memory storing a system state change module for determining whether a system state change occurred during a boot process before booting into an instant on application stored on the instant on partition, the system state change module comprising instructions executable by the processor for;
    determining, when booting from the instant on partition, whether the system state change can cause the information handling system to improperly boot when booting into the instant on application;
    identifying the system state change;
    performing a corrective action based upon the identifying; and wherein
    the determining whether the system state change can cause the information handling system to improperly boot includes determining whether any locked conditions have occurred as a result of the system state change.

12. The information handling system of claim 11 wherein the system state change comprises a customer initiated system state change.

13. The information handling system of claim 11 wherein the system state change comprises a system initiated system state change.

14. The information handling system of claim 11 wherein the system state change module further comprises instructions for:

associating a system state change indication with each system state change; and, wherein the performing is based upon the system state change indication.

15. The information handling system of claim 14 wherein the instructions for performing the corrective action call an operating environment manager, the operating environment manager spawning additional processes to repair the information handling system.

* * * * *